(12) United States Patent
Chang (10) Patent No.: US 11,890,984 B1
(45) Date of Patent: Feb. 6, 2024

(54) VEHICLE LAMP HAVING SWITCHING STRUCTURE FOR LOW-BEAM AND HIGH-BEAM HEADLIGHTS

(71) Applicant: SONAR AUTO PARTS CO., LTD., New Taipei (TW)

(72) Inventor: Chung-Yi Chang, Hsinchu County (TW)

(73) Assignee: SONAR AUTO PARTS CO., LTD., New Taipei (TW)

( * ) Notice: Subject to any disclaimer, the term of this patent is extended or adjusted under 35 U.S.C. 154(b) by 0 days.

(21) Appl. No.: 18/148,409

(22) Filed: Dec. 29, 2022

(51) Int. Cl.
| | | |
|---|---|---|
| *F21S 41/63* | (2018.01) | |
| *B60Q 1/076* | (2006.01) | |
| *B60Q 1/068* | (2006.01) | |
| *F21S 41/20* | (2018.01) | |
| *F21V 29/503* | (2015.01) | |
| *F21S 41/141* | (2018.01) | |
| *F21Y 115/10* | (2016.01) | |

(52) U.S. Cl.
CPC ........... *B60Q 1/076* (2013.01); *B60Q 1/0683* (2013.01); *F21S 41/141* (2018.01); *F21S 41/20* (2018.01); *F21V 29/503* (2015.01); *F21Y 2115/10* (2016.08)

(58) Field of Classification Search
CPC ..... B60Q 1/076; B60Q 1/0683; F21S 41/141; F21S 41/20; F21V 29/503; F21Y 2115/10
See application file for complete search history.

(56) References Cited

U.S. PATENT DOCUMENTS

| | | | |
|---|---|---|---|
| 11,047,545 B1* | 6/2021 | Chang | ..................... F21S 41/25 |
| 2013/0039084 A1 | 2/2013 | Abe | |
| 2017/0059109 A1* | 3/2017 | Matsumoto | ............. F21S 41/43 |
| 2020/0189447 A1 | 6/2020 | Hsu et al. | |

FOREIGN PATENT DOCUMENTS

| | | |
|---|---|---|
| CN | 103528004 A | 1/2014 |
| CN | 109237425 A | 1/2019 |
| CN | 113623568 A | 11/2021 |
| TW | M639712 U | 4/2023 |

* cited by examiner

*Primary Examiner* — Elmito Breval
(74) *Attorney, Agent, or Firm* — Li & Cai Intellectual Property Office (57) ABSTRACT

A vehicle lamp having a switching structure for low-beam and high-beam headlights is provided. The vehicle lamp includes a heat dissipating device, an LED light source, an electromagnet, a reflector assembly, a lens unit, a light-shaping plate, a driving rod, and an intermediate plate. The LED light source and the electromagnet are disposed on the heat dissipating device, and the light-shaping plate is rotatably disposed on the electromagnet. The driving rod is disposed between the electromagnet and the light-shaping plate, and the electromagnet drives the driving rod to synchronously drive the light-shaping plate to be moved to a first position or a second position. The intermediate plate is replaceably connected between the lens unit and the heat dissipating device.

7 Claims, 8 Drawing Sheets

VEHICLE LAMP HAVING SWITCHING STRUCTURE FOR LOW-BEAM AND HIGH-BEAM HEADLIGHTS

FIELD OF THE DISCLOSURE

The present disclosure relates to a vehicle lamp, and more particularly to a vehicle lamp having a switching structure for low-beam and high-beam headlights.

BACKGROUND OF THE DISCLOSURE

A vehicle such as an automobile or a motorcycle generally has a headlight disposed at a front thereof. The headlight includes a lamp seat and a vehicle light source mounted in the lamp seat, and the vehicle light source can switch between outputting low-beam and high-beam headlights. The headlight can switch between low-beam and high-beam modes by using a switching device to change a reflected light of the light source, so as to achieve switching between the low-beam and high-beam modes. However, a reflector that reflects light has a curved and complicated structure that reflects both low-beam and high-beam lights, and incurs high manufacturing cost.

Furthermore, because form factors of lamp seats are different for headlights adopted in different vehicle models, a common problem is that the vehicle light source cannot be used in different headlights without being redesigned and redeveloped, which causes an increase in overall cost.

SUMMARY OF THE DISCLOSURE

In response to the above-referenced technical inadequacies, the present disclosure provides a vehicle lamp having a switching structure for low-beam and high-beam headlights, and the vehicle lamp of the present disclosure can be used in lamp seats of different vehicle models.

In one aspect, the present disclosure provides a vehicle lamp having a switching structure for low-beam and high-beam headlights. The vehicle lamp includes a heat dissipating device, an LED light source, an electromagnet, a reflector assembly, a lens unit, a light-shaping plate, a driving rod, and an intermediate plate. The LED light source is disposed on the heat dissipating device. The electromagnet is disposed on the heat dissipating device. The reflector assembly is located above the LED light source. The lens unit is located in front of the reflector assembly. Light emitted from the LED light source is capable of being reflected by the reflector assembly and being irradiated outward through the lens unit. The light-shaping plate is rotatably disposed between the reflector assembly and the lens unit. The light-shaping plate is pivotally connected to the heat dissipating device by a rotation shaft and is able to be moved between a first position and a second position. The driving rod is disposed between the electromagnet and the light-shaping plate. The electromagnet is capable of driving the driving rod to synchronously drive the light-shaping plate to be moved to the first position or the second position so as to change a reflected light of the LED light source, and the reflected light forms a low-beam or a high-beam.

In certain embodiments, the intermediate plate has a horizontal portion and two vertical portions, and the two vertical portions are respectively connected to two ends of the horizontal portion. The horizontal portion has at least one first lamp seat assembly hole formed thereon, and each of the two vertical portions has at least one second lamp seat assembly hole formed thereon.

In certain embodiments, the driving rod has a pivot portion, an active end, and a slave end, and the active end and the slave end are respectively connected to two ends of the pivot portion. The pivot portion is pivotally connected to a pivot shaft of the heat dissipating device, the active end is connected to the electromagnet, and the slave end is connected to and the light-shaping plate. The active end is capable of moving along a direction that is perpendicular to a light axis and the slave end is capable of moving along a front-rear direction, so as to change directions of power transmission of the electromagnet and the light-shaping plate.

In certain embodiments, the electromagnet includes an action rod, and the light-shaping plate has a shielding portion and a linkage portion. The linkage portion is connected to the shielding portion, the active end is connected to the action rod of the electromagnet, and the slave end is connected to the linkage portion of the light-shaping plate, so that when the electromagnet is activated, the action rod is capable of driving the light-shaping plate through the driving rod. The active end abuts against the action rod of the electromagnet, and the slave end abuts against the linkage portion of the light-shaping plate.

In certain embodiments, the vehicle lamp further includes an adjustment rod. The light-shaping plate further has a stressed portion that is arranged below the rotation shaft. An adjustment groove and an adjustment screw seat are formed on the heat dissipating device, the adjustment groove extends from a rear end of the heat dissipating device toward a front of the heat dissipating device, and the adjustment screw seat is located in the adjustment groove and adjacent to the light-shaping plate. The adjustment rod is screwed to the adjustment screw seat of the heat dissipating device, one end of the adjustment rod is exposed from the rear end of the heat dissipating device for adjustment, and another end of the adjustment rod abuts against the stressed portion of the light-shaping plate.

In certain embodiments, the light-shaping plate has a shielding portion and a linkage portion, the linkage portion is connected to the shielding portion, and the driving rod is connected to the linkage portion of the light-shaping plate. The shielding portion includes a bottom plate and a rear plate, the rear plate is a plate body that is arc-shaped, and the rear plate is erected at an edge of the bottom plate. The bottom plate and the rear plate have an included angle therebetween that is greater than 90 degrees, so that the bottom plate is obliquely connected to the rear plate, and a height of the rear plate decreases from two sides of the rear plate toward the middle of the rear plate.

In certain embodiments, the electromagnet is disposed at a front end of the heat dissipating device, and the electromagnet is horizontally disposed at the front end of the heat dissipating device.

In certain embodiments, the light-shaping plate is arranged above the electromagnet, and an elastic element is disposed between the heat dissipating device and the light-shaping plate to provide an elastic force for allowing the light-shaping plate to elastically recover, so that the light-shaping plate is moved to the first position.

In certain embodiments, the reflector assembly includes an upper reflector and a lower reflector, the lower reflector is U-shaped and fixed to the heat dissipating device, and the upper reflector is fixed to a top surface of the lower reflector. Light emitted from the LED light source is reflected by the lower reflector to form the high-beam, and the light emitted from the LED light source is reflected by the upper reflector to form the low-beam.

In certain embodiments, the lower reflector has a lower reflection portion and a lower assembly plate, and the lower assembly plate is connected to and surrounds a top edge of the lower reflection portion. A plurality of positioning columns protrude upward from a carrying surface of the heat dissipating device, a plurality of lower positioning holes are formed on the lower assembly plate, and the plurality of lower positioning holes are sleeved on the plurality of positioning columns. The upper reflector has an upper reflection portion and an upper assembly plate, and the upper assembly plate is connected to and surrounds a bottom edge of the upper reflection portion. A plurality of upper positioning holes and a plurality of screw holes are formed on the upper assembly plate, and the upper positioning holes of the upper assembly plate are sleeved on the plurality of positioning columns, so that the upper reflector and the lower reflector are locked to the heat dissipating device.

Therefore, in the vehicle lamp having a switching structure for low-beam and high-beam headlights provided by the present disclosure, the light-shaping plate is rotatably disposed between the reflector assembly and the lens unit, and is able to be moved between a first position and a second position. The driving rod is disposed between the electromagnet and the light-shaping plate. The electromagnet is capable of driving the driving rod to synchronously drive the light-shaping plate to be moved to the first position or the second position so as to change a reflected light of the LED light source, and the reflected light forms a low-beam or a high-beam.

Furthermore, the intermediate plate is replaceably connected between the lens unit and the heat dissipating device, and a plurality of lamp seat assembly holes are formed on the intermediate plate. The lamp seat assembly holes allow the intermediate plate to be fixed to lamp housings of different shapes, so that the vehicle lamp of the present disclosure can be used in headlights of different vehicle models.

Moreover, the adjustment rod is disposed on the heat dissipating device. One end of the adjustment rod abuts against the stressed portion of the light-shaping plate, and when the adjustment rod rotates, the adjustment rod can push the stressed portion, such that the stressed portion synchronously drives the light-shaping plate so that a position of the light-shaping plate is adjusted. Therefore, the light-shaping plate can be fine-tuned to an optimal position.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

EMBODIMENT

Figure 1:
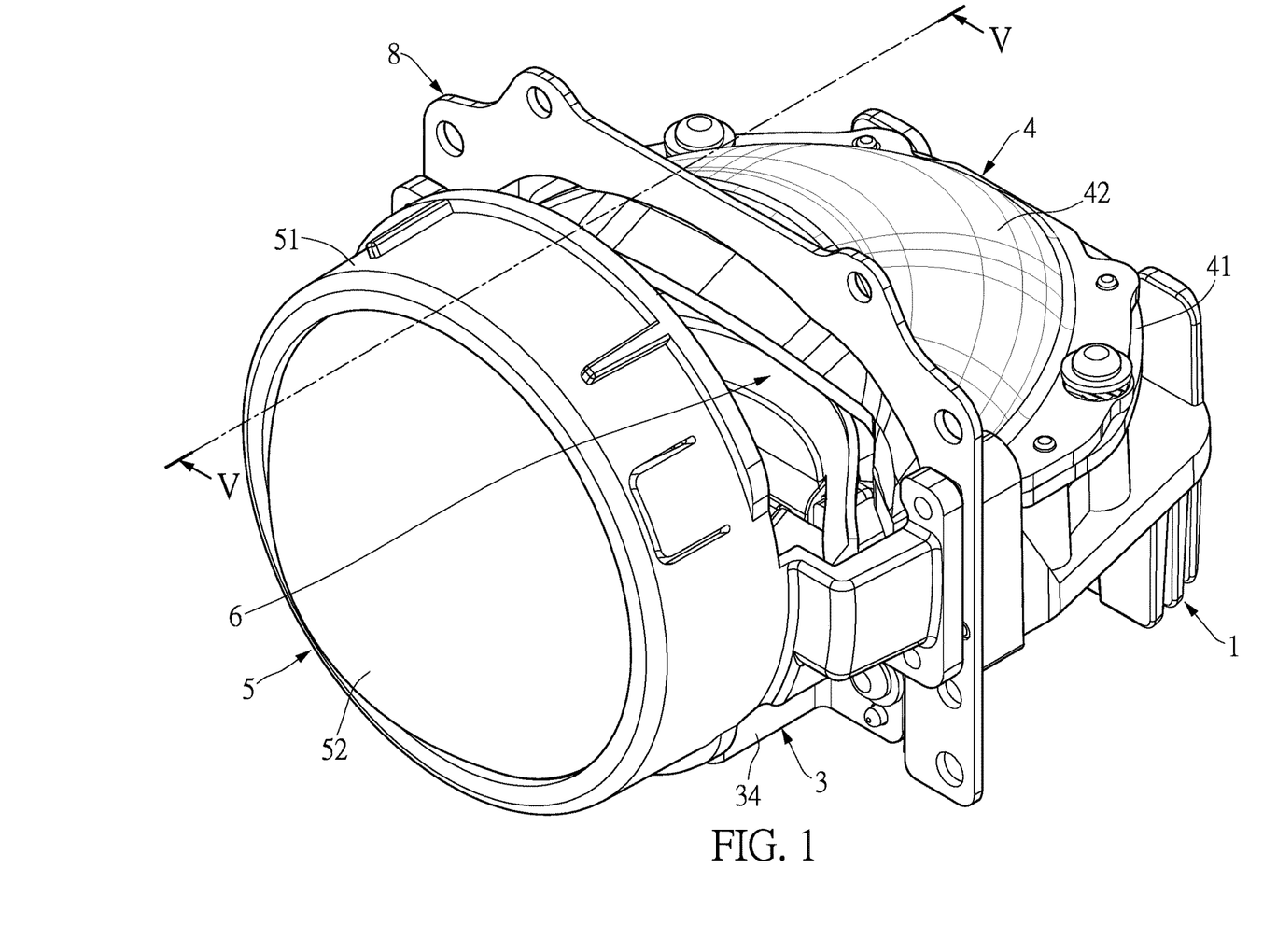
FIG. 1 is a schematic perspective view of a vehicle lamp having a switching structure for low-beam and high-beam headlights of the present disclosure.
Figure 2:
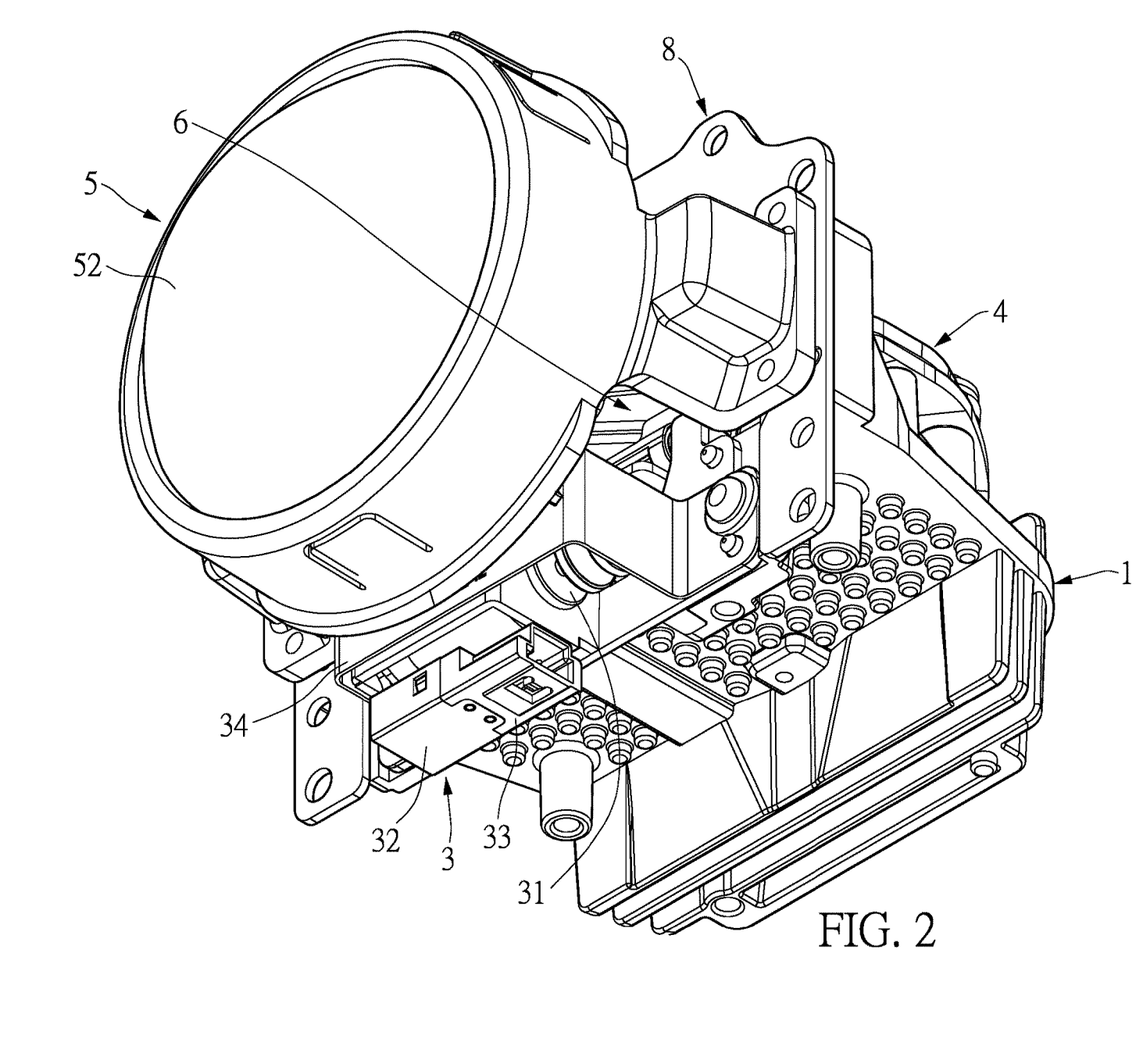
FIG. 2 is another schematic perspective view of the vehicle lamp of the present disclosure.
Figure 3:
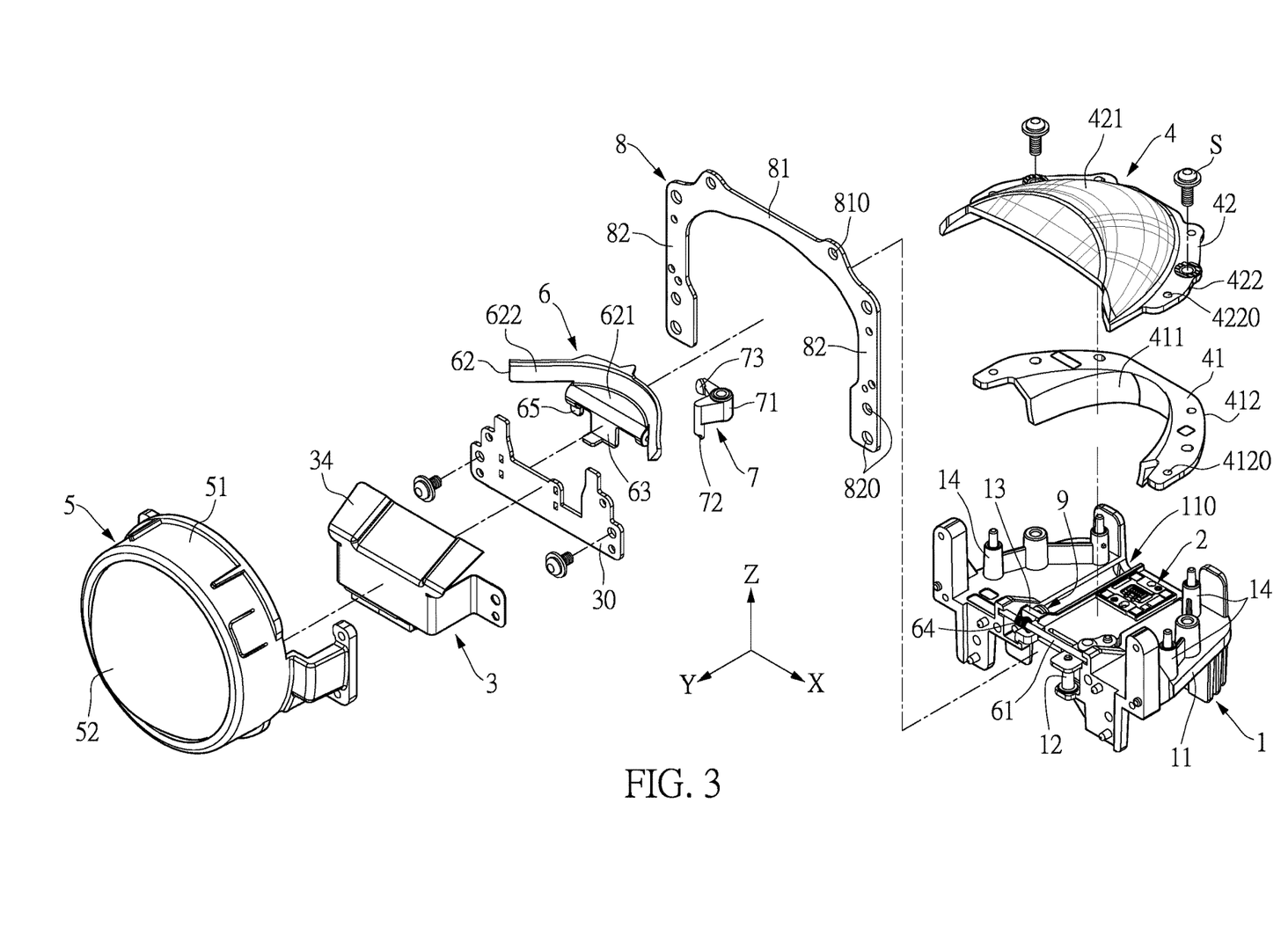
FIG. 3 is a schematic exploded perspective view of the vehicle lamp of the present disclosure.

Referring to FIG. 1 to FIG. 3, one embodiment of the present disclosure provides a vehicle lamp having a switching structure for low-beam and high-beam headlights. The vehicle lamp is suitable for being mounted on an automobile or motorcycle to switch between a low-beam and a high-beam. The vehicle lamp includes a heat dissipating device 1, an LED light source 2, an electromagnet 3, a reflector assembly 4, a lens unit 5, a light-shaping plate 6, a driving rod 7, an intermediate plate 8, and an adjustment rod 9.

The heat dissipating device 1 is manufactured from a metal material (e.g., copper or aluminum) having good thermal conductivity, and a structure of the heat dissipating device 1 is not limited in the present disclosure. As shown in FIG. 3, the heat dissipating device 1 has a carrying surface 11, and the LED light source 2 is disposed on the carrying surface 11. The LED light source 2 can emit light upwardly. A heat generated from the LED light source 2 can be transmitted to the heat dissipating device 1, so that the heat dissipating device 1 can be used to aid in heat dissipation.

Figure 4:
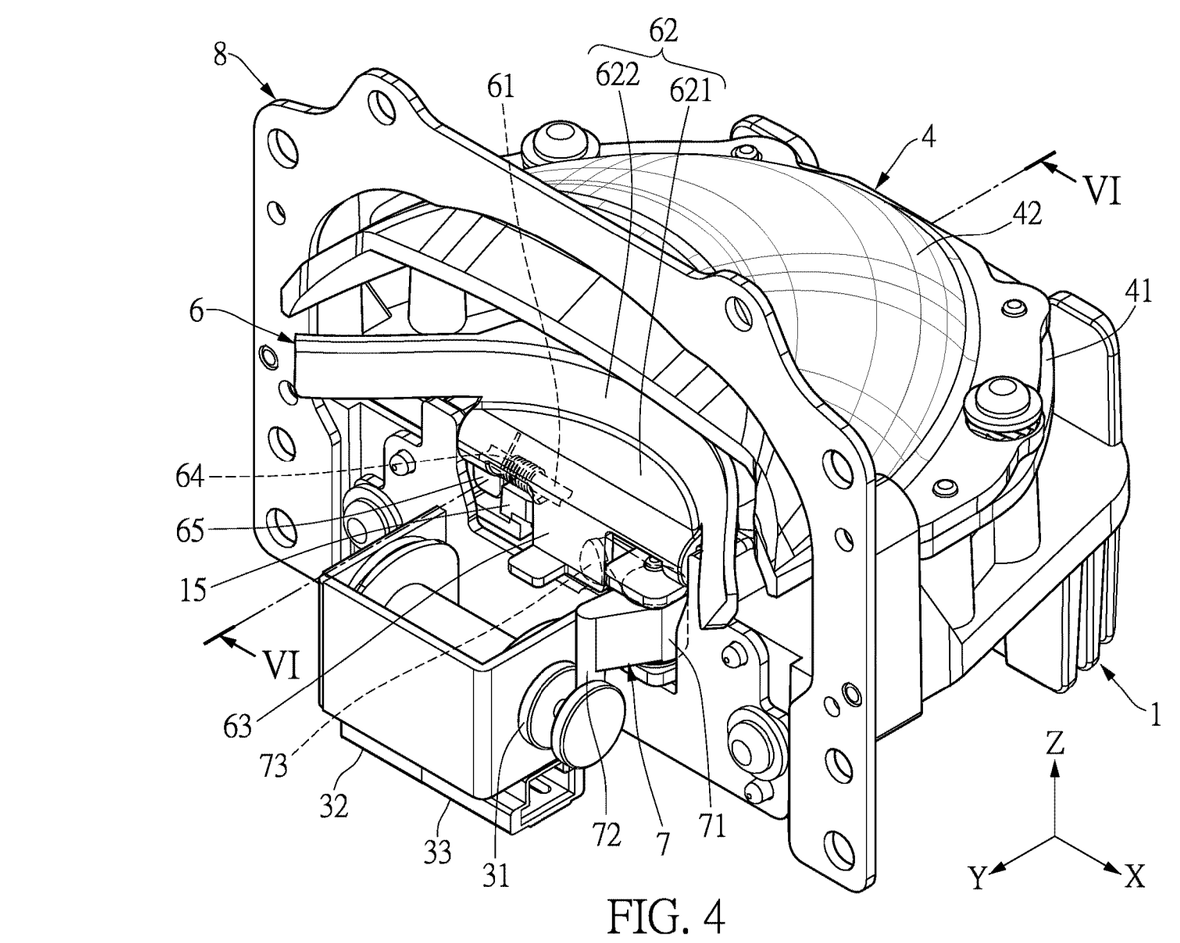
FIG. 4 is a schematic perspective view of the vehicle lamp of the present disclosure at a low-beam state.

Referring to FIG. 4, the electromagnet 3 is disposed on the heat dissipating device 1 via a fixing seat 30. The electromagnet 3 can be disposed at a front end of the heat dissipating device 1, and the electromagnet 3 can include an action rod 31 for outputting power. A Zener diode 32 and a connector 33 can be disposed at a bottom portion of the electromagnet 3. The Zener diode 32 is electrically connected between the electromagnet 3 and the connector 33 and provides voltage stabilization. The connector 33 can be used to input an electrical power, and the electrical power is transmitted to the electromagnet 3 through the Zener diode 32, so that an operation of the electromagnet 3 can be controlled. In the present disclosure, a protective housing 34 can be disposed outside the coils of the electromagnet 3 for insulating residual heat.

Figure 5:
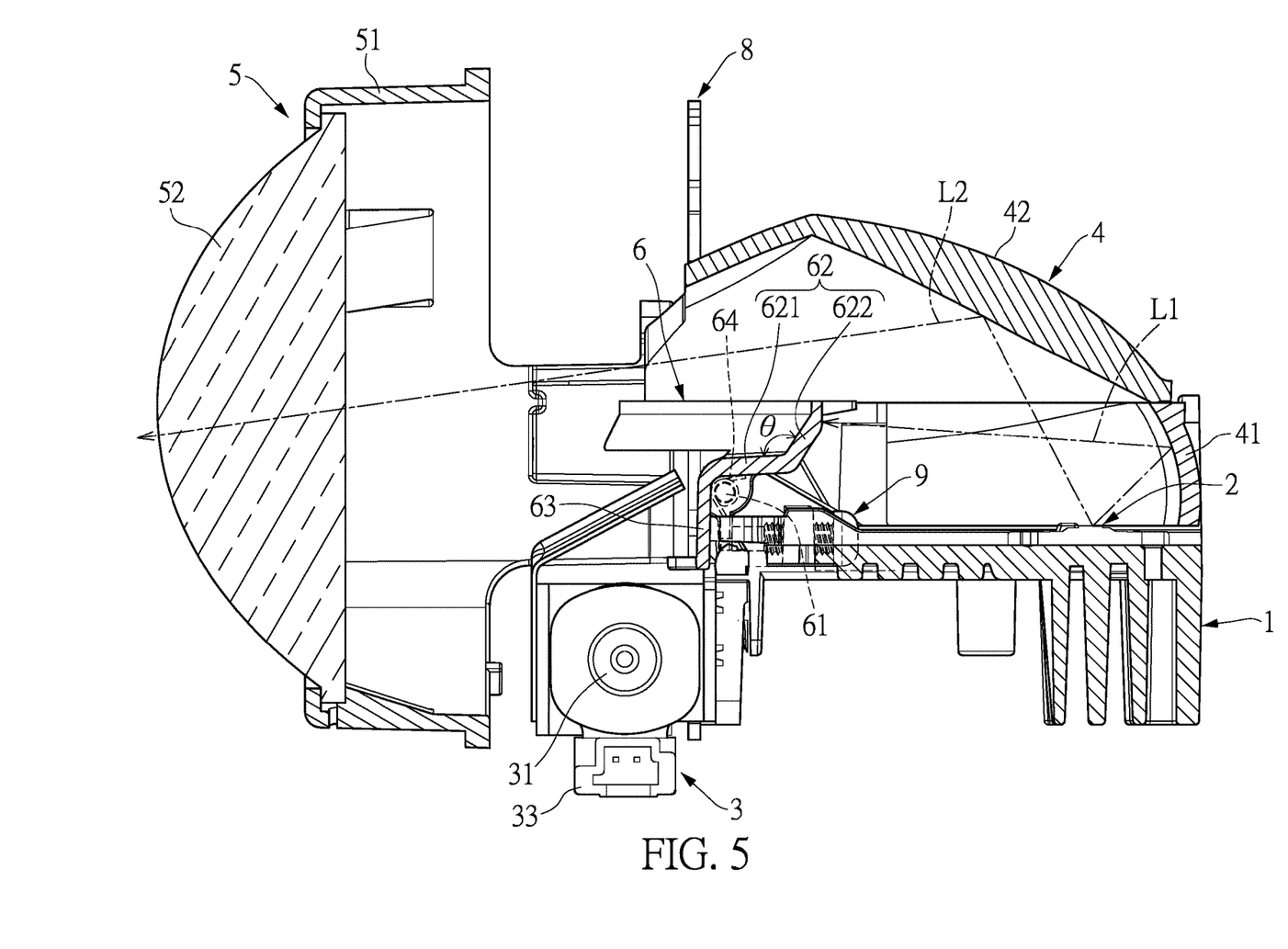
FIG. 5 is a schematic cross-sectional view taken along line V-V of FIG. 1.

As shown in FIG. 3 to FIG. 5, the reflector assembly 4 is located above the LED light source 2. In this embodiment, the reflector assembly 4 includes an upper reflector 42 and a lower reflector 41, the lower reflector 41 is U-shaped and fixed to the heat dissipating device 1, and the upper reflector 42 is fixed to a top surface of the lower reflector 41 to jointly form a reflection surface that is located at an inner side of the reflector assembly 4.

As shown in FIG. 3, specifically, the lower reflector 41 has a lower reflection portion 411 and a lower assembly plate 412, and the lower assembly plate 412 is connected to and surrounds a top edge of the lower reflection portion 411. In this embodiment, a principle of using multiple points to define a co-plane is utilized. Four positioning columns 14 protrude upward from the carrying surface 11 of the heat dissipating device 1, four lower positioning holes 4120 are formed on the lower assembly plate 412, and the lower assembly plate 412 is sleeved on the four positioning columns 14. The upper reflector 42 has an upper reflection portion 421 and an upper assembly plate 422, and the upper assembly plate 422 is connected to and surrounds a bottom edge of the upper reflection portion 421. Four upper positioning holes 4220 and two screw holes are formed on the upper assembly plate 422, and one of the screw holes is located between two of the four upper positioning holes 4220, while the other one of the screw holes is located between the remaining two of the four upper positioning holes 4220. The four upper positioning holes 4220 of the upper assembly plate 422 are sleeved on the four positioning columns 14. The upper reflector 42 and the lower reflector 41 are then locked to the heat dissipating device 1 via two screws S. In this embodiment, the upper reflector 42 and the lower reflector 41 can be manufactured separately so as to be formed more easily. Furthermore, the upper reflector 42 and the lower reflector 41 can be manufactured using different materials, thereby reducing the manufacturing cost.

The lens unit 5 is located in front of the reflector assembly 4. In this embodiment, the lens unit 5 is fixed on the heat dissipating device 1 via the intermediate plate 8. Specifically, the lens unit 5 includes a lens frame 51 and a lens 52, a rear end of the lens frame 51 is locked to the intermediate plate 8, and the lens 52 is fixed to a front end of the lens frame 51. In the aforementioned structure, one advantage is that the lens 52 does not require threaded holes or connection portions to be formed thereon, so that a manufacturing cost of the lens 52 can be reduced. Furthermore, the lens 52 can be changed to a different lens 52 by replacing the lens frame 51 with a different lens frame 51.

Light emitted from the LED light source 2 can be reflected by the reflection surface of the reflector assembly 4 and irradiated outward through the lens unit 5. In this embodiment, the light emitted from the LED light source 2 is reflected by the lower reflector 41 to form the high-beam, and the light emitted from the LED light source 2 is reflected by the upper reflector 42 to form the low-beam.

Figure 7:
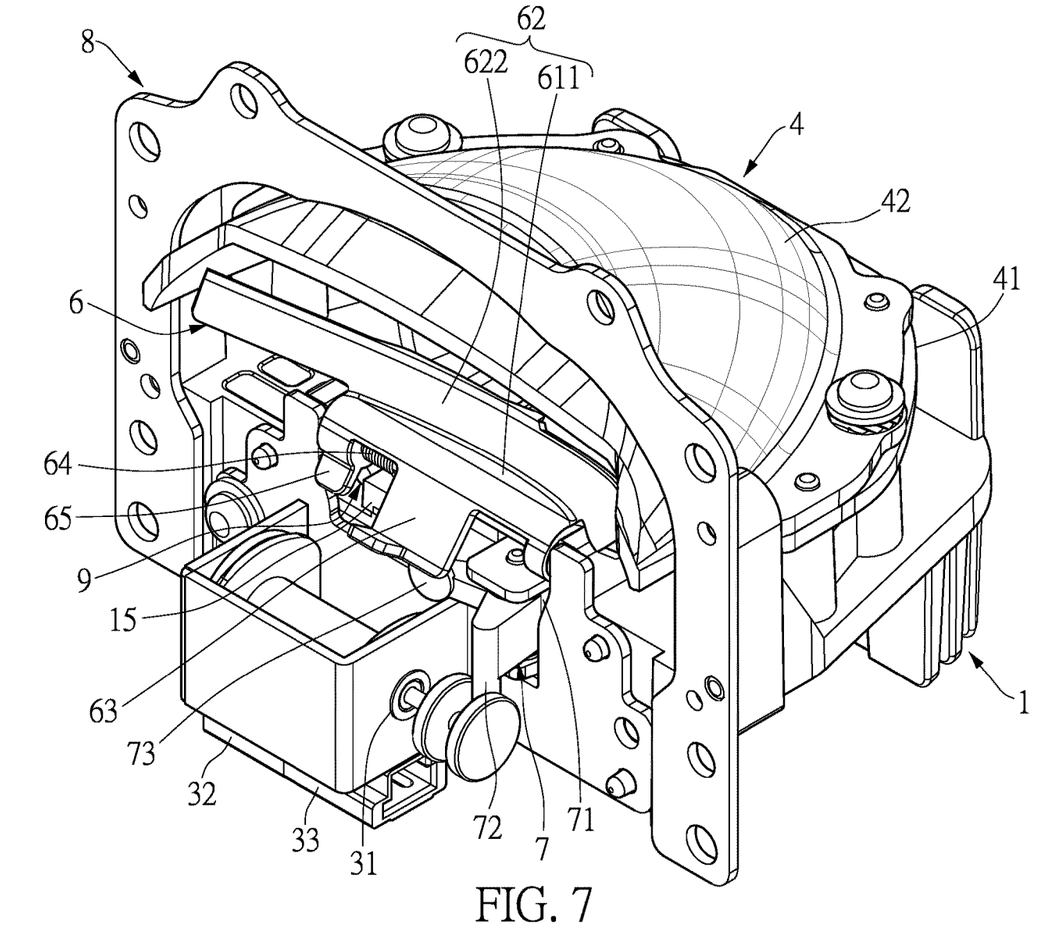
FIG. 7 is a schematic perspective view of the vehicle lamp of the present disclosure at a high-beam state.
Figure 8:
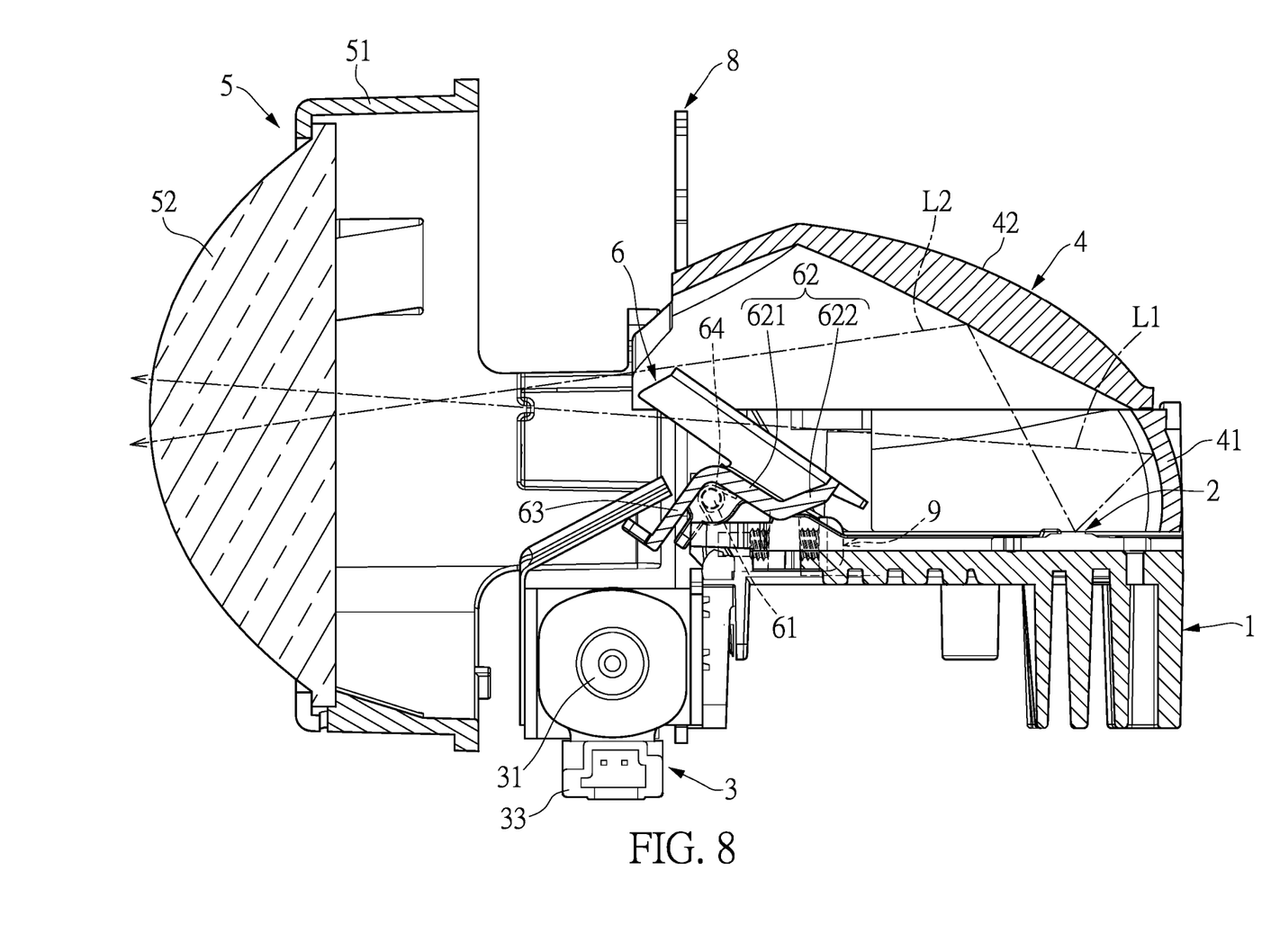
FIG. 8 is a cross-sectional view of the vehicle lamp of the present disclosure at the high-beam state.

As shown in FIG. 3 to FIG. 5, the light-shaping plate 6 is rotatably disposed between the reflector assembly 4 and the lens unit 5, and the light-shaping plate 6 is pivotally connected to the heat dissipating device 1 by an a rotation shaft 61. As shown in FIG. 3, the rotation shaft 61 is arranged along a horizontal direction, that is, the direction of the X-axis. The light-shaping plate 6 can be located above the electromagnet 3. The light-shaping plate 6 can be moved between a first position (as shown in FIG. 4 and FIG. 5, or can be called as in an upright state) and a second position (as shown in FIG. 7 and FIG. 8, or can be called as in a reclined state). Specifically, the light-shaping plate 6 has a shielding portion 62 and a linkage portion 63, and the linkage portion 63 is connected to the shielding portion 62.

As shown in FIG. 3 to FIG. 5, an elastic element 64 can be sleeved on the rotation shaft 61. The elastic element 64 is a torque spring that is sleeved on the rotation shaft 61, and two ends of the elastic element 64 respectively abut against a positioning bump 15 (as shown in FIG. 4) of the heat dissipating device 1 and the light-shaping plate 6, so as to provide an elastic force for allowing the light-shaping plate 6 to elastically recover so that the light-shaping plate 6 is moved to the first position (as shown in FIG. 4 and FIG. 5) as in a normal state. Preferably, the shielding portion 62 includes a bottom plate 621 and a rear plate 622, the rear plate 622 is a plate body that is arc-shaped, and the rear plate 622 is erected at an edge of the bottom plate 621. When the light-shaping plate is located at the second location (as shown in FIG. 7 and FIG. 8), light passes through middle of the arc-shaped rear plate 622.

As shown in FIG. 5, the bottom plate 621 and the rear plate 622 have an included angle θ therebetween that is greater than 90 degrees. The included angle θ is from 95 degrees to 150 degrees, e.g., the included angle θ can be 95 degrees, 100 degrees, 110 degrees, 120 degrees, 130 degrees, 140 degrees, or 150 degrees. The included angle θ is an obtuse angle, so that the bottom plate 621 is obliquely connected to the rear plate 622, and the bottom plate 621 and the rear plate 622 have an a preferred angle therebetween. Furthermore, a height of the rear plate 622 decreases from two sides of the rear plate 622 toward the middle of the rear plate 622, so that a better light shape can be presented.

The driving rod 7 is disposed between the electromagnet 3 and the light-shaping plate 6. The electromagnet 3 can drive the driving rod 7 to synchronously drive the light-shaping plate 6 to be moved to the first position (as shown in FIG. 4 and FIG. 5) or the second position (as shown in FIG. 7 and FIG. 8) so as to change a reflected light of the LED light source 2, and the reflected light forms a low-beam or a high-beam.

As shown in FIG. 3, preferably, the driving rod 7 has a pivot portion 71, an active end 72, and a slave end 73 (as shown in FIG. 3). The active end 72 and the slave end 73 are respectively connected to two ends of the pivot portion 71, and the pivot portion 71 is pivotally connected to a pivot shaft 12 of the heat dissipating device 1, so that the driving rod 7 can be rotatably disposed on the heat dissipating device 1. In this embodiment, a light axis is a direction in which the vehicle lamp projects light (i.e., the direction of the Y-axis as shown in FIG. 3). The pivot shaft 12 is arranged along a direction perpendicular to the light axis (i.e., the direction of the Z-axis as shown in FIG. 3), the active end 72 is parallel to a direction in which the pivot shaft 12 is arranged, and the active end protrudes downward from a front end of the pivot portion 71. The slave end 73 is extended horizontally from a top end of the pivot portion 71 along a direction that is perpendicular to the direction in which the pivot shaft 12 is arranged.

The active end 72 is connected to the electromagnet 3, and the slave end 73 is connected to the light-shaping plate 6. That is, the active end 72 can be connected to the action rod 31 of the electromagnet 3, and the slave end 73 can be connected to the linkage portion 63 of the light-shaping plate 6. In this embodiment, the active end 72 abuts against the action rod 31 of the electromagnet 3, and the slave end 73 abuts against the linkage portion 63 of the light-shaping plate 6, such that assembly of the vehicle lamp is simple and easy, and a preferred power transmission structure can be formed.

When the electromagnet 3 is activated, the action rod 31 can drive the light-shaping plate 6 through the driving rod 7 so that the light-shaping plate 6 is located at the first position (as shown in FIG. 4 and FIG. 5) or the second position (as shown in FIG. 7 or FIG. 8). Preferably, the active end 72 can move along a direction that is perpendicular to the light axis, i.e., a left-right direction (e.g., the direction of the X-axis as shown in FIG. 4), and the slave end 73 can move along a front-rear direction (e.g., the direction of the Y-axis as shown in FIG. 4). That is, the active end 72 can be pushed by the action rod 31 of the electromagnet 3 to move along the left-right direction (e.g., the direction of the X-axis as shown in FIG. 4) via the pivot portion 71, so that the slave end 73 can move along the front-rear direction (e.g., the direction of the Y-axis as shown in FIG. 4) to push the linkage portion 63 of the light-shaping plate 6. Accordingly, the action rod 31 of the electromagnet 3 can drive the light-shaping plate 6 through the driving rod 7. In this embodiment, a distance from the active end 72 to the slave end 73 can be lengthened, so that a moment arm is lengthened, and a power required for driving can be reduced.

In the aforementioned structure, one advantage is that the electromagnet 3 can be horizontally disposed at a front end of the heat dissipating device 1 to save an occupied space and decrease an overall height. At this time, the electromagnet 3 can simultaneously drive the light-shaping plate 6 through the driving rod 7, such that the light-shaping plate 6 can rotate around the rotation shaft 61, so that the arrangement of the electromagnet 3 and the light-shaping plate 6 can be more flexible.

As shown in FIG. 4 and FIG. 5, the light-shaping plate 6 is located at the first position, and the electromagnet 3 simultaneously drive the light-shaping plate 6 through the driving rod 7, such that the light-shaping plate 6 rotates forward and is in the upright state. An oblique upward light L1 emitted by the LED light source 2 is shielded after the oblique upward light L1 is reflected by the reflection surface of the reflector assembly 4. That is, the shielding portion 62 of the light-shaping plate 6 is raised and shields the oblique upward light L1 reflected by the lower reflector 41. Furthermore, a light L2 is reflected by the upper reflector 42, passes above the shielding portion 62, and obliquely and downwardly passes through the lens unit 5 so that a light shape of the low-beam is produced.

As shown in FIG. 7 and FIG. 8, the light-shaping plate 6 is located at the second position, and the electromagnet 3 simultaneously drives the light-shaping plate 6 through the driving rod 7, such that the light-shaping plate 6 is lowered and is in the reclined state. The oblique upward light L1 emitted by the LED light source 2 is not shielded after the oblique upward light L1 is reflected by the reflection surface of the reflector assembly 4, so that a light shape of the high-beam is formed. That is, the shielding portion 62 of the light-shaping plate 6 is lowered and does not shield the oblique upward light L1, and the oblique upward light L1 passes through the middle of the arc-shaped rear plate 622 and provides the high-beam. Therefore, the light-shaping plate 6 can be used to change a reflected light of the light source and switch between a low-beam and a high-beam.

In the present disclosure, the vehicle lamp having the switching structure for low-beam and high-beam headlights further includes the intermediate plate 8. The intermediate plate 8 is disposed between the heat dissipating device 1 and the lens unit 5. The intermediate plate 8 has a horizontal portion 81 and two vertical portions 82, and the two vertical portions 82 are respectively connected to two ends of the horizontal portion 81. The horizontal portion 81 has a plurality of first lamp seat assembly holes 810 formed thereon, and each of the two vertical portions 82 has a plurality of second lamp seat assembly holes 820 formed thereon. The lamp seat assembly holes allow the intermediate plate 8 to be fixed to lamp housings of different shapes, so that the vehicle lamp of the present disclosure can be used in headlights of different vehicle models.

Figure 6:
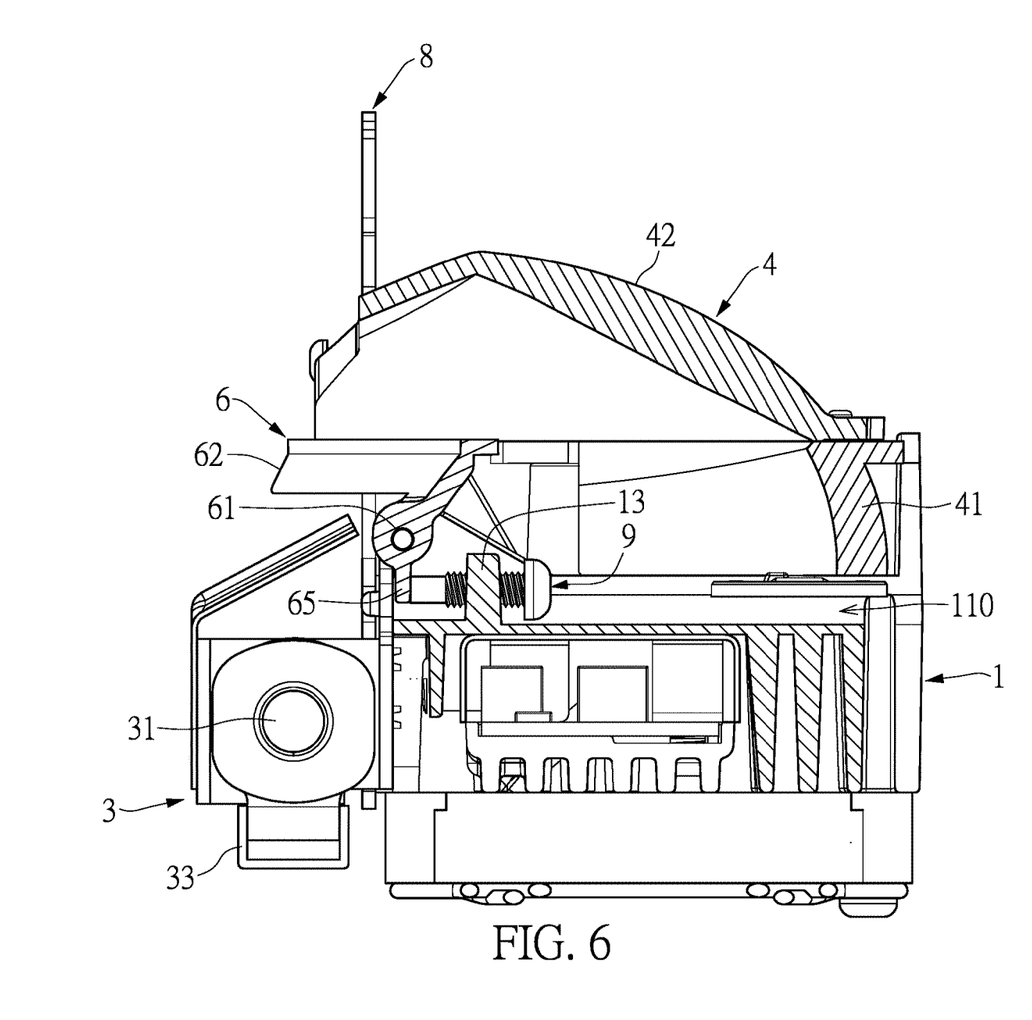
FIG. 6 is a schematic cross-sectional view taken along line VI-VI of FIG. 4.

Reference is made to FIG. 3 and FIG. 6, in which the adjustment rod 9 is disposed on the heat dissipating device 1, and the adjustment rod 9 can penetrate through the heat dissipating device 1. One end of the adjustment rod 9 abuts against the light-shaping plate 6, and another end of the adjustment rod 9 can be exposed from the heat dissipating device 1 to facilitate turning and adjustment of the adjustment rod 9. In this embodiment, the adjustment rod 9 can be a screw, and the adjustment rod 9 is screwed on the heat dissipating device 1. Specifically, the adjustment rod 9 can be screwed to a threaded hole 13 of the heat dissipating device 1 (as shown in FIG. 6). The adjustment rod 9 can be horizontally disposed, but it is not limited thereto. An angle by which the adjustment rod 9 is disposed can also be appropriately modified. The light-shaping plate 6 has a stressed portion 65, the stressed portion 65 is disposed below the rotation shaft 61, and the stressed portion 65 can be disposed on one side of the shielding portion 62. The one end of the adjustment rod 9 abuts against the stressed portion 65 of the light-shaping plate 6. When the adjustment rod 9 rotates, the one end of the adjustment rod 9 can push the stressed portion 65, and the stressed portion 65 synchronously drives the light-shaping plate 6 to rotate, so that a position of the light-shaping plate 6 is adjusted. Therefore, the light-shaping plate 6 can be fine-tuned to an optimal position, so as to calibrate the light shape.

As shown in FIG. 3, preferably, the adjustment rod 9 is adjacent to one side of the heat dissipating device 1. An adjustment groove 110 and an adjustment screw seat 13 are formed on the heat dissipating device 1. The adjustment groove 110 extends from a rear end of the heat dissipating device 1 toward a front of the heat dissipating device 1. More specifically, the adjustment groove 110 is half-cylindrically shaped and is recessed from the carrying surface 11 of the heat dissipating device 1, and the adjustment groove 110 is located on one side of the LED light source 2. The adjustment screw seat 13 is located in the adjustment groove 110 and adjacent to the light-shaping plate 6. The adjustment rod 9 is screwed to the adjustment screw seat 13 of the heat dissipating device 1, and one end of the adjustment rod 9 is exposed from the rear end of the heat dissipating device 1 for being adjusted by operating personnel. Preferably, the adjustment rod 9 can be a screw rod, in which a head of the adjustment rod 9 can be turned by using a screw driver. Furthermore, another end of the adjustment rod 9 abuts against the stressed portion 65 of the light-shaping plate 6.

Beneficial Effects of the Embodiment

In conclusion, in the vehicle lamp having a switching structure for low-beam and high-beam headlights provided by the present disclosure, the light-shaping plate is rotatably disposed between the reflector assembly and the lens unit, and is able to be moved between a first position and a second position. The driving rod is disposed between the electromagnet and the light-shaping plate. The electromagnet is capable of driving the driving rod to synchronously drive the light-shaping plate to be moved to the first position or the second position so as to change a reflected light of the LED light source, and the reflected light forms a low-beam or a high-beam.

Furthermore, the intermediate plate is replaceably connected between the lens unit and the heat dissipating device, and a plurality of lamp seat assembly holes are formed on the intermediate plate. The lamp seat assembly holes allow the intermediate plate to be fixed to lamp housings of different shapes, so that the vehicle lamp of the present disclosure can be used in headlights of different vehicle models.

Moreover, the adjustment rod is disposed on the heat dissipating device. One end of the adjustment rod abuts against the stressed portion of the light-shaping plate, and when the adjustment rod rotates, the adjustment rod can push the stressed portion, such that the stressed portion synchronously drives the light-shaping plate so that a position of the light-shaping plate is adjusted. Therefore, the light-shaping plate can be finely adjusted to an optimal position.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A vehicle lamp having a switching structure for low-beam and high-beam headlights, comprising:
    a heat dissipating device;
    an LED light source disposed on the heat dissipating device;
    an electromagnet disposed on the heat dissipating device;
    a reflector assembly located above the LED light source;
    a lens unit located in front of the reflector assembly, wherein light emitted from the LED light source is capable of being reflected by the reflector assembly and being irradiated outward through the lens unit;
    a light-shaping plate being rotatably disposed between the reflector assembly and the lens unit, wherein the light-shaping plate is pivotally connected to the heat dissipating device by a rotation shaft and is able to be moved between a first position and a second position;
    a driving rod disposed between the electromagnet and the light-shaping plate; wherein the electromagnet is capable of driving the driving rod to synchronously drive the light-shaping plate to be moved to the first position or the second position so as to change a reflected light of the LED light source, so that the reflected light forms a low-beam or a high-beam; and
    an intermediate plate replaceably connected between the lens unit and the heat dissipating device, wherein a plurality of lamp seat assembly holes are formed on the intermediate plate;
    wherein the intermediate plate has a horizontal portion and two vertical portions, and the two vertical portions are respectively connected to two ends of the horizontal portion; wherein the horizontal portion has at least one first lamp seat assembly hole formed thereon, and each of the two vertical portions has at least one second lamp seat assembly hole formed thereon; and
    wherein the driving rod has a pivot portion, an active end, and a slave end, and the active end and the slave end are respectively connected to two ends of the pivot portion, wherein the pivot portion is pivotally connected to a pivot shaft of the heat dissipating device, the active end is connected to the electromagnet, and the slave end is connected to and the light-shaping plate, wherein the active end is capable of moving along a direction that is perpendicular to a light axis and the slave end is capable of moving along a front-rear direction, so as to change directions of power transmission of the electromagnet and the light-shaping plate.

2. The vehicle lamp according to claim 1, wherein the electromagnet includes an action rod, and the light-shaping plate has a shielding portion and a linkage portion; wherein the linkage portion is connected to the shielding portion, the active end is connected to the action rod of the electromagnet, and the slave end is connected to the linkage portion of the light-shaping plate, so that when the electromagnet is activated, the action rod is capable of driving the light-shaping plate through the driving rod, wherein the active end abuts against the action rod of the electromagnet, and the slave end abuts against the linkage portion of the light-shaping plate.

3. The vehicle lamp according to claim 2, further comprising an adjustment rod; wherein the light-shaping plate further has a stressed portion that is arranged below the rotation shaft; wherein an adjustment groove and an adjustment screw seat are formed on the heat dissipating device, the adjustment groove extends from a rear end of the heat dissipating device toward a front of the heat dissipating device, and the adjustment screw seat is located in the adjustment groove and adjacent to the light-shaping plate; wherein the adjustment rod is screwed to the adjustment screw seat of the heat dissipating device, one end of the adjustment rod is exposed from the rear end of the heat dissipating device for adjustment, and another end of the adjustment rod abuts against the stressed portion of the light-shaping plate.

4. The vehicle lamp according to claim 1, wherein the light-shaping plate has a shielding portion and a linkage portion, the linkage portion is connected to the shielding portion, and the driving rod is connected to the linkage portion of the light-shaping plate; wherein the shielding portion includes a bottom plate and a rear plate, the rear plate is a plate body that is arc-shaped, and the rear plate is erected at an edge of the bottom plate; wherein the bottom plate and the rear plate have an included angle therebetween that is greater than degrees, so that the bottom plate is obliquely connected to the rear plate, and a height of the rear plate decreases from two sides of the rear plate toward the middle of the rear plate.

5. The vehicle lamp according to claim 1, wherein the electromagnet is disposed at a front end of the heat dissipating device, and the electromagnet is horizontally disposed at the front end of the heat dissipating device.

6. The vehicle lamp according to claim 1, wherein the light-shaping plate is arranged above the electromagnet, and wherein an elastic element is disposed between the heat dissipating device and the light-shaping plate to provide an elastic force for allowing the light-shaping plate to elastically recover, so that the light-shaping plate is moved to the first position.

7. A vehicle lamp having a switching structure for low-beam and high-beam headlights, comprising:
a heat dissipating device;
an LED light source disposed on the heat dissipating device;
an electromagnet disposed on the heat dissipating device;
a reflector assembly located above the LED light source;
a lens unit located in front of the reflector assembly, wherein light emitted from the LED light source is capable of being reflected by the reflector assembly and being irradiated outward through the lens unit;
a light-shaping plate being rotatably disposed between the reflector assembly and the lens unit, wherein the light-shaping plate is pivotally connected to the heat dissipating device by a rotation shaft and is able to be moved between a first position and a second position;
a driving rod disposed between the electromagnet and the light-shaping plate; wherein the electromagnet is capable of driving the driving rod to synchronously drive the light-shaping plate to be moved to the first position or the second position so as to change a reflected light of the LED light source, so that the reflected light forms a low-beam or a high-beam;
an intermediate plate replaceably connected between the lens unit and the heat dissipating device, wherein a plurality of lamp seat assembly holes are formed on the intermediate plate,
wherein the reflector assembly includes an upper reflector and a lower reflector, the lower reflector is U-shaped and fixed to the heat dissipating device, and the upper reflector is fixed to a top surface of the lower reflector; wherein light emitted from the LED light source is reflected by the lower reflector to form the high-beam, and the light emitted from the LED light source is reflected by the upper reflector to form the low-beam;
wherein the lower reflector has a lower reflection portion and a lower assembly plate, and the lower assembly plate is connected to and surrounds a top edge of the lower reflection portion; wherein a plurality of positioning columns protrude upward from a carrying surface of the heat dissipating device, a plurality of lower positioning holes are formed on the lower assembly plate, and the plurality of lower positioning holes are sleeved on the plurality of positioning columns; wherein the upper reflector has an upper reflection portion and an upper assembly plate, and the upper assembly plate is connected to and surrounds a bottom edge of the upper reflection portion; wherein a plurality of upper positioning holes and a plurality of screw holes are formed on the upper assembly plate, and the upper positioning holes of the upper assembly plate are sleeved on the plurality of positioning columns, so that the upper reflector and the lower reflector are locked to the heat dissipating device.

\* \* \* \* \*